United States Patent [19]

Ridealgh

[11] Patent Number: 5,407,037
[45] Date of Patent: Apr. 18, 1995

[54] INTERNAL SHOE DRUM BRAKE HAVING DIVERGING ABUTMENT SURFACES

[75] Inventor: Paul F. Ridealgh, Newport, Wales

[73] Assignee: Lucas Industries public limited company, West Midlands, England

[21] Appl. No.: 974,090

[22] Filed: Nov. 10, 1992

[30] Foreign Application Priority Data

Nov. 19, 1991 [GB] United Kingdom ............... 9124645

[51] Int. Cl.⁶ .............................................. F16D 65/09
[52] U.S. Cl. .................................. 188/250 F; 188/341
[58] Field of Search ..................... 188/325, 331, 250 B, 188/250 R, 250 H, 250 F, 250 G, 341; 192/107 T

[56] References Cited

U.S. PATENT DOCUMENTS

| | | | |
|---|---|---|---|
| 1,980,225 | 11/1934 | Parker et al. | 188/250 F |
| 2,718,284 | 9/1955 | Anderson | 188/78 |
| 2,989,150 | 6/1961 | Compton | 188/341 |
| 3,324,975 | 6/1967 | Cumming | 188/78 |
| 3,596,741 | 8/1971 | Miyajima | 188/106 P |

FOREIGN PATENT DOCUMENTS

| | | | |
|---|---|---|---|
| 2436085 | 2/1976 | Germany | 188/331 |
| 1560939 | 2/1980 | United Kingdom. | |
| 2057075 | 3/1981 | United Kingdom. | |

*Primary Examiner*—Matthew C. Graham
*Attorney, Agent, or Firm*—Trexler, Bushnell, Giangiorgi & Blackstone, Ltd.

[57] ABSTRACT

A brake shoe for an internal shoe drum brake has an arcuate platform carrying a lining of friction material on its outer face. A web extends perpendicularly from the inner face of the platform and provides a shoe tip intended to be supported on an angled surface of the brake abutment. This shoe tip has a pair of differently directed surface portions. The invention also embraces an internal shoe drum brake incorporating a pair of the aforesaid shoes of which the abutment shoe tips are arranged so that the abutment is engaged respectively by non-corresponding ones of the shoe tip surface portions.

13 Claims, 2 Drawing Sheets

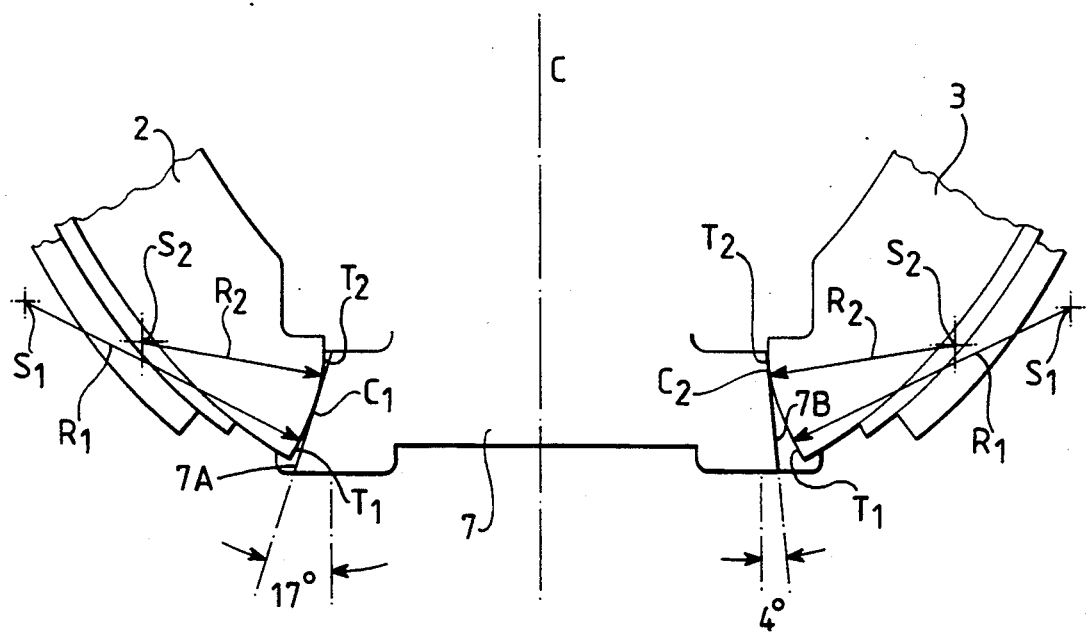

INTERNAL SHOE DRUM BRAKE HAVING DIVERGING ABUTMENT SURFACES

BACKGROUND

This invention relates to an internal shoe drum brake, primarily for a motor vehicle, and of the general kind having a pair of brake shoes mounted on a backplate and separable by an actuator into braking engagement with a rotary brake drum, one pair of adjacent shoe ends providing shoe tips slidably engaged respectively with oppositely directed faces of a fixed abutment which resists braking torque applied to the shoes from the rotating drum during braking.

In two-leading shoe or Duplex drum brakes, the shoes have generally similar operating characteristics and their lining thickness and arcuate extent, as well as their abutment shoe tips can be identical. The shoes are therefore interchangeable, leading to considerable cost savings in terms of reduced parts inventory and simplified production. Such interchangeability of the shoes also provides safety benefit in that the risk of incorrect assembly is considerably reduced.

The operating characteristics of some leading/trailing shoe or Simplex brakes require different specific orientations of the respective abutment shoe tips and the abutment surfaces on which they are supported in order to achieve the desired performance from this type of brake. The leading shoe in some such brakes tends to wear the more rapidly and is traditionally provided with a thicker lining than the trailing shoe. Such a brake is therefore inherently expensive to produce and carries an attendant risk of incorrect assembly of the brake shoes. Standardising the thickness and arcuate extent of the shoe lining in such a brake requires the angles of the abutment surfaces to differ substantially from each other and positioning of the shoe tip contact points at specific locations on the abutment is also necessary. Such requirements can be incompatible with the brake geometry of existing brakes and unsatisfactory performance can result.

SUMMARY

An object of the invention is to provide a brake shoe which permits interchangeability of shoes in a Simplex type internal shoe drum brake, and a brake incorporating a plurality of such shoes.

According to the invention, the shoes of a brake of the aforesaid general kind have shoe tips each formed by two differently directed surface portions and the shoes are arranged so that the abutment is engaged respectively by non-corresponding shoe tip surface portions of the shoes, one of the surfaces of the abutment engaged by the shoe tips diverging from the other surface in a direction away from the centre of the brake.

Preferably, the shoe tip surfaces are mutually divergent in a direction away from the centre line of the brake.

In one preferred embodiment, the abutment surfaces engaged by the shoe tips are differently inclined and the shoe tips engage the abutments respectively at different locations therealong.

In a typical practical example, the angles made respectively by the leading and trailing shoe abutments with a line extending through the centre of the brake perpendicular to the abutment may be between 10° and 20° and preferably 17° for the leading shoe, and between 0° and 10° and preferably 4° for the trailing shoe.

Conveniently, at least one of the shoe tip surface portions of each shoe is arcuate and, typically both portions are arcuate and arranged so that the centres of the respective arcs are non-coincident. The arcuate shoe tip surface portions may have different radii, being typically about 100 mm and about 60 mm.

Typically the arcuate shoe tip surface portions on each shoe are arranged so that the lines passing through the centre points of the surface portions and the respective centres of the arcs intersect.

Preferably, the lining thickness of the two shoes, and conveniently the arcuate extent of the linings also, are identical.

From another aspect of the invention, a brake shoe for use in the aforesaid internal shoe drum brake comprises an arcuate platform carrying a lining of friction material on one side thereof and a web extending generally perpendicularly from the other side of the platform and providing a shoe tip at at least one end thereof for engagement with the brake abutment, the shoe tip being formed by at least two arcuate surface portions having non-coincident centres of arc, the surface portions being arranged so that the lines passing through the centre points of the surface portions and the respective centres of the arcs intersect.

This arrangement enables the discontinuity between the arcuate surface portions on each shoe to be minimised.

Preferably, the arcuate surface portions have different radii, being typically about 100 mm and about 60 mm.

BRIEF DESCRIPTION OF THE DRAWINGS

The invention will now be described, by way of example, with reference to the accompanying drawings in which:

FIG. 3 is a detail illustrating diagrammatically an alternative embodiment of the brake of the invention.

Referring to FIG. 1 of the drawings, this illustrates an internal shoe drum brake which has a backplate 1 upon which are mounted brake shoes 2 and 3, each having a platform 2a, 3a carrying a lining of friction material 2b, 3b on the outer face thereof, the inner face having a web 2c, 3c extending perpendicularly from approximately the lateral centre of the platform, in conventional manner. The thickness of the linings 2b, 3b is identical, being chosen to provide the required wear life. The outer ends of the webs form shoe tips, of which those 2d, 3d respectively engage tappet heads 4, 5 forming part of an actuator 6 operable to expand the shoes outwardly into braking engagement with a surrounding rotary brake drum (not shown). The forward direction of drum rotation is indicated by arrow A. The shoe tips at the other ends of the webs engage an abutment device 7 which is fixed to or integral with the backplate 1 and serves to react the torque forces imparted to the shoes by the drum during braking.

Figure 2:
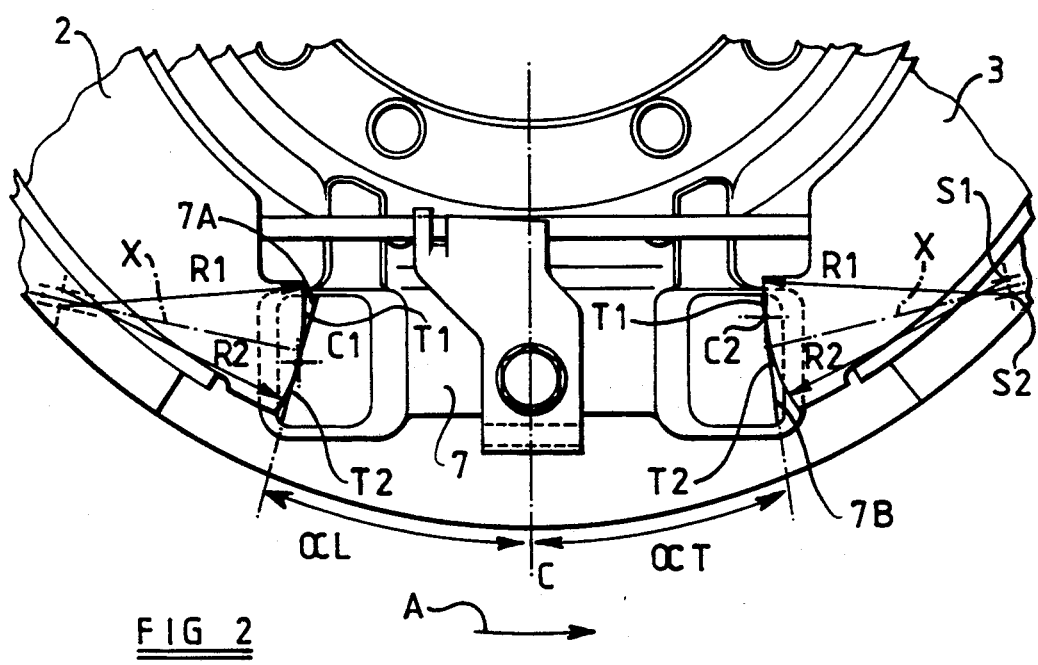
FIG. 2 is a fragmentary front view illustrating part of the brake of FIG. 1 to an enlarged scale.

Details of the abutment 7 and the shoe tips which engage it are illustrated more clearly in FIG. 2. The abutment has a pair of oppositely facing abutment surfaces 7A, 7B which are respectively inclined at different angles $\alpha L$ and $\alpha T$ relative to the centre line C of the brake, which passes through the brake centre C' and is directed at right angles to the abutment. The angle αL is the inclination of the leading shoe abutment surface and αT is the equivalent angle for the trailing shoe abutment surface. It will be seen that the inclination αL of the abutment surface 7A is greater than that of αT of the abutment surface 7B. In this embodiment, angle αL and angle αT denote the leading and trailing abutment angles respectively and can be chosen according to the desired brake characteristics. In practice, each of the abutment surfaces forms the base of a slot within which the associated shoe tip is engaged for restraint perpendicular to the backplate 1.

The abutment shoe tips of the two shoes are identical and each comprises a pair of arcuate edge surface portions designated respectively T1 and T2. In this embodiment, the surfaces T1, T2 have identical radii, but are struck from different centres spaced respectively at either side from a line X which, for convenience, is the radial centre line through a notional shoe tip formed by a single arc. It will be seen that, for the leading shoe, the shoe tip portion T1 contacts the abutment 7A at a point C1 on the abutment; conversely, for the trailing shoe, the shoe tip portion T2 contacts the abutment 7B at a point C2.

As will be understood by those versed in the art, the arcuate shoe tips pivot on the abutments during brake actuation and also slide therealong as lining wear occurs. In order to optimise the brake geometry, the contact point C1 of the leading shoe for the unworn shoe condition is arranged to be in the region of the longitudinal centre of the abutment surface 7A and will move downwardly as lining wear occurs. For the trailing shoe, the initial position of the contact point C2 is towards the top of the abutment surface 7B and will move towards the longitudinal centre of this surface as lining wear occurs. The radii R1, R2 of the respective surfaces T1, T2 are chosen, for the particular abutment angles illustrated, in order to provide the desired brake geometry.

In the particular arrangement illustrated, the respective radii R1, R2 of the shoe tip portions of each shoe are equal and the arcs of these portions are struck from points S1, S2 which lie to either side of the corresponding line X referred to above. As shown, the points S1, S2 are unequally spaced from this line, but these spacings may be varied as desired, and may be equal. The striking of the arcs from such different centres results in these arcs being differently directed in order to achieve the required different points of contact of the arcs with the respective abutments. It may alternatively be possible to use different arcs struck from a single centre of different centres to achieve the same effect.

Because the shoe lining thickness and the abutment shoe tips of the two shoes are identical, it will be seen that the shoes may be interchanged for use at either side of the brake and the operative surfaces of the shoe tips will be transposed so that the shoe tip portion T1 of shoe 2 will contact the abutment at C2 and the shoe tip portion T2 of shoe 3 will contact the abutment at C1 for the unworn lining condition of the shoes.

The differently shaped surface portions of the respective abutment shoe tips may be varied as desired, as may the angles of the abutment surfaces 7A, 7B consistent with the required brake geometry. For example, although both shoe tip portions of each shoe have been described and illustrated as arcuate, it may be possible for one shoe tip portion to be planar. When both portions are arcuate, the degree of curvature of the respective portions may differ substantially, depending upon the angles of the abutment surfaces on the abutment, one of which may be parallel to the centre line C of the brake, or substantially so. It would also be possible for each shoe tip to have more than two portions. Moreover, by making the shoe tips of each shoe identical with each other, it would be possible to provide a shoe which is interchangeable as between the actuator and abutment ends of the brake, as well as from side to side thereof. Whilst the invention has been described in relation to a single web shoe, it could equally be applied to a shoe of twin or multi-web configuration.

Figure 1:
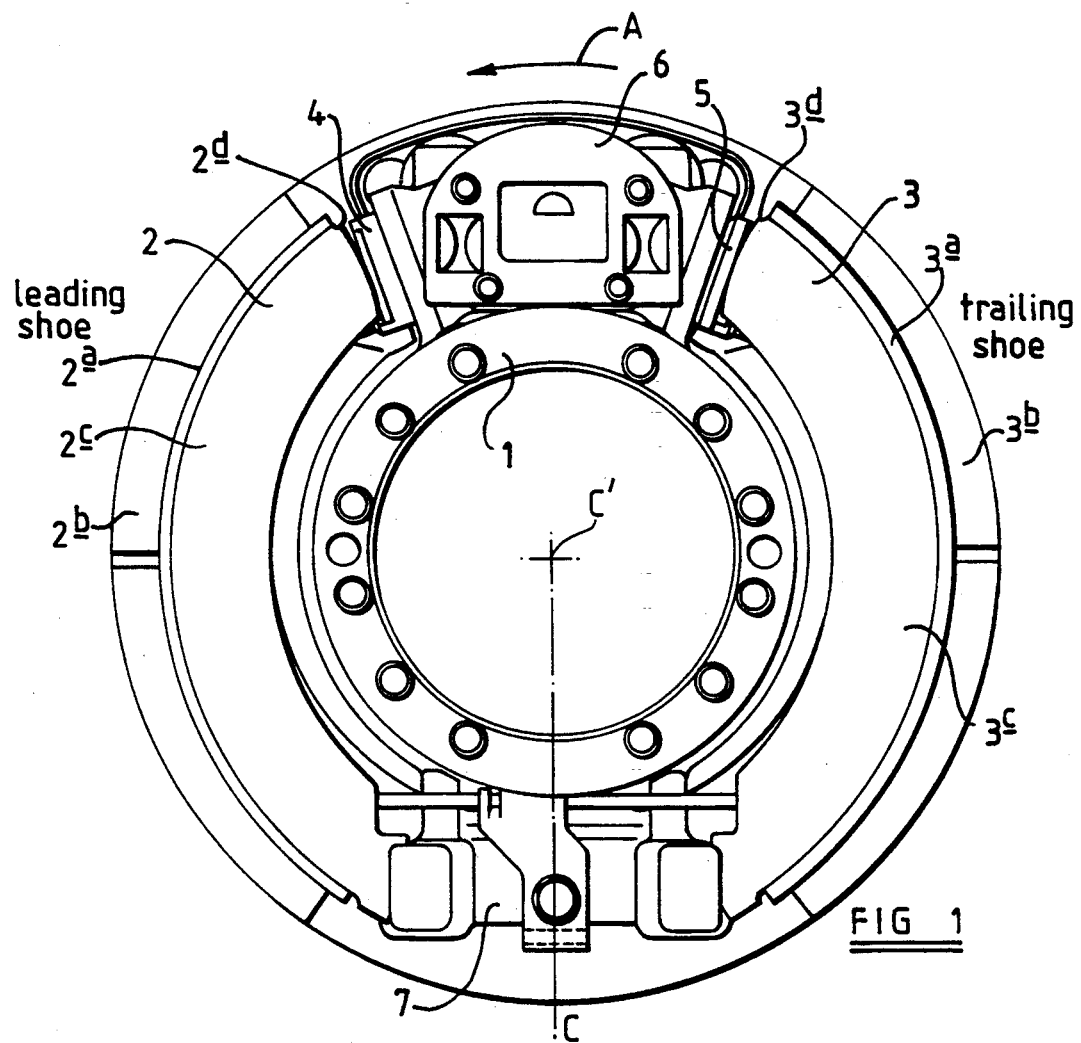
FIG. 1 is a front view of one form of the internal shoe drum brake of the invention.

In the alternative embodiment illustrated in FIG. 3, the shoe tip portions T1 and T2 of each shoe tip are of different radii R1, R2 and struck respectively from different centres S1, S2. Typical values for the radii R1 and R2 are approximately 100 mm for R1 and approximately 60 mm for R2. The abutment surfaces 7A, 7B in this embodiment are angled respectively at 17° and 4° relative to the centre line C which passes through the brake centre and is directed at right angles to the abutment 7, as in the embodiment of FIGS. 1 and 2. In use, the shoe tip portion T1 of the shoe 2 rests on the abutment surface 7A at point C1 and the shoe tip portion T2 of the shoe 3 rests on the abutment surface 7B at point C2, as previously, performing pivotal and sliding movements during brake operation and in the course of lining wear.

It will be seen that by providing a pair of identical brake shoes in which the abutment shoe tips are composed of a plurality of shoe tip portions, it is possible to use two identical brake shoes in a leading/trailing brake, even with widely varying abutment angles. Moreover, ease of manufacture is considerably increased by the reduction in parts and the chance of incorrect assembly of the shoes in the brake is very much reduced since either shoe can be used at either side of the brake.

In all embodiments of the shoe of the invention in which the shoe tips for engagement with the abutment have a pair of arcuate surface portions with non-coincident centres of arc, the surface portions are arranged so that the lines passing through the centre points of the surface portions and the respective centres of the arcs formed by these surface portions intersect. This arrangement enables the two surface portions to merge with the minimum possible interruption at their junction.

What is claimed is:

1. An internal shoe drum brake of the leading/trailing shoe type, comprising a pair of interchangeable brake shoes mounted on a backplate and separable by an actuator into braking engagement with a rotary brake drum the shoes having respective linings of friction material of identical thickness carried in identical positions thereon over the same arcuate extent, one pair of adjacent shoe ends providing shoe tips slidably engaged respectively with oppositely directed faces of a fixed abutment which resists braking torque applied to the shoes from the rotating drum during braking, the shoe tips being identical and each formed by two differently directed surface portions, the shoes being arranged so that the abutment is engaged respectively by non-corresponding shoe tip surface portions of the shoes, the abutment surfaces engaged by the shoe tips are differently inclined and the shoe tips engage the abutments respectively at different locations therealong, a centerline radially extending from the center of the brake towards the abutment, surfaces of the abutment engaged by the shoe tips diverging relative to the centerline in a direction away from the centre of the brake.

2. A brake according to claim 1, wherein the shoe tip surfaces are mutually divergent in a direction away from the centre line of the brake.

3. A brake according to claim 1, wherein the angle made by the leading shoe abutment with a line extending through the centre of the brake perpendicular to the abutment is between 10° and 20°.

4. A brake according to claim 1, wherein the angle made by the trailing shoe abutment with a line extending through the centre of the brake perpendicular to the abutment is between 0° and 10°.

5. A brake according to claim 1, wherein the angles made respectively by the leading and trailing shoe abutment surfaces with a line extending through the centre of the brake perpendicular to the abutment are 17° and 4°.

6. A brake according to claim 1, wherein at least one of the shoe tip surface portions on each shoe is arcuate.

7. A brake according to claim 6, wherein the arcuate shoe tip surface portions on each shoe are arranged so that the lines passing through the centre points of the surface portions and the respective centres of the arcs intersect.

8. A brake according to claim 1, wherein both shoe tip surface portions on each shoe are arcuate and arranged so that the centres of the respective arcs are non-coincident.

9. A shoe according to claim 8, wherein the arcuate shoe tip surface portions of each shoe have different radii.

10. A shoe according to claim 8, wherein the arcuate shoe tip surface portions of each shoe have the same radii.

11. A brake according to claim 8, wherein on each shoe, the arcuate surface portions have respective radii of about 100 mm and about 60 mm.

12. A brake according to claim 1, wherein the lining thicknesses of the shoes are identical.

13. A brake according to claim 1, wherein the arcuate extent of the shoe linings of the shoes is identical.

* * * * *